US009751514B1

(12) United States Patent
Pfefferl

(10) Patent No.: US 9,751,514 B1
(45) Date of Patent: Sep. 5, 2017

(54) AIR MONITORING SYSTEM

(71) Applicant: Bendix Commercial Vehicle Systems LLC, Elyria, OH (US)

(72) Inventor: David J. Pfefferl, Broadview Heights, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/599,502

(22) Filed: May 19, 2017

Related U.S. Application Data

(63) Continuation of application No. 15/190,330, filed on Jun. 23, 2016, now Pat. No. 9,688,262.

(51) Int. Cl.
*B60Q 1/00* (2006.01)
*B60T 17/22* (2006.01)

(52) U.S. Cl.
CPC .................... *B60T 17/221* (2013.01)

(58) Field of Classification Search
CPC .................................................. B60T 17/221
USPC ......... 340/451; 417/18, 53, 63; 62/125, 230; 365/226
See application file for complete search history.

(56) References Cited

U.S. PATENT DOCUMENTS

| 5,560,213 | A | * | 10/1996 | Wieszt | B60H 1/00978 62/125 |
| 7,043,412 | B1 | * | 5/2006 | Schultz | B60T 17/18 417/292 |
| 8,943,846 | B1 | * | 2/2015 | Hartley | G05D 23/20 62/157 |
| 2007/0070771 | A1 | * | 3/2007 | Joergensen | G11O 5/143 365/226 |
| 2008/0069656 | A1 | * | 3/2008 | Volokh | B23C 3/02 409/200 |

* cited by examiner

*Primary Examiner* — Ojiako Nwugo
(74) *Attorney, Agent, or Firm* — Cheryl L. Greenly; Brian E. Kondas; Eugene E. Clair

(57) ABSTRACT

A controller for monitoring an air system in a vehicle comprises an input for receiving at least one pressure signal indicative of an air pressure in an air system an output for transmitting an alert to a vehicle operator; and control logic. The control logic is capable of determining an instant cut out time indicative of the time for the at least one air pressure signal to reach a cut out pressure value from a cut in pressure value; determining a difference between the instant cut out time to an average cut out time; and transmitting a leakage alert at the output in response to the instant cut out time being greater than or equal to a predetermined difference from the average cut out time. The control logic is also capable of changing the compressor operation in response to the alert.

16 Claims, 4 Drawing Sheets

AIR MONITORING SYSTEM

CROSS-REFERENCE TO RELATED APPLICATIONS

The present application is a continuation of application Ser. No. 15/190,330 "Air Monitoring System" filed Jun. 23, 2016. The entire disclosure of the aforementioned application is herein expressly incorporated by reference.

BACKGROUND

The present invention relates to a controller and method for monitoring an air system on a vehicle equipped with an air brake system and/or other air controlled systems. Air brake systems are efficient means of providing braking power to heavy vehicles, especially separable vehicles such as tractors and trailers. However air systems are prone to leakage and air flow obstructions due to the multiple valves and the potentially long connections between the valves. Compressor operation may degrade over time without warning and affect the air pressure available to the braking system. There is a desire to have an efficient method to monitor the air system operation for any leakage, obstruction, component degradation or other problems that may affect air system effectiveness.

SUMMARY

Various embodiments of an apparatus for monitoring an air system in a vehicle are disclosed. A controller for monitoring an air system comprises an input for receiving at least one pressure signal indicative of air pressure in an air system and a processor having control logic. The control logic determines a volume of the air system at a first time based on the at least one air pressure signal and a vehicle factor; determines the volume of the air system at a second time based on the at least one air pressure signal and the vehicle factor; determines the difference between the volume at the first time and the volume at the second time; and transmits an alert in response to a difference between the volume at the first time and volume at the second time. The control logic is also capable of changing the compressor operation in response to the alert.

In accordance with another aspect, various embodiments of a method for monitoring an air system are disclosed. The method comprises determining a volume at a first time based on the at least one air pressure signal and a vehicle factor; determining the volume at a second time based on the at least one air pressure signal and the vehicle factor; determining the difference between the volume at the first time with the volume at the second time; and setting a leakage alert in response to the difference being greater than a predetermined difference.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
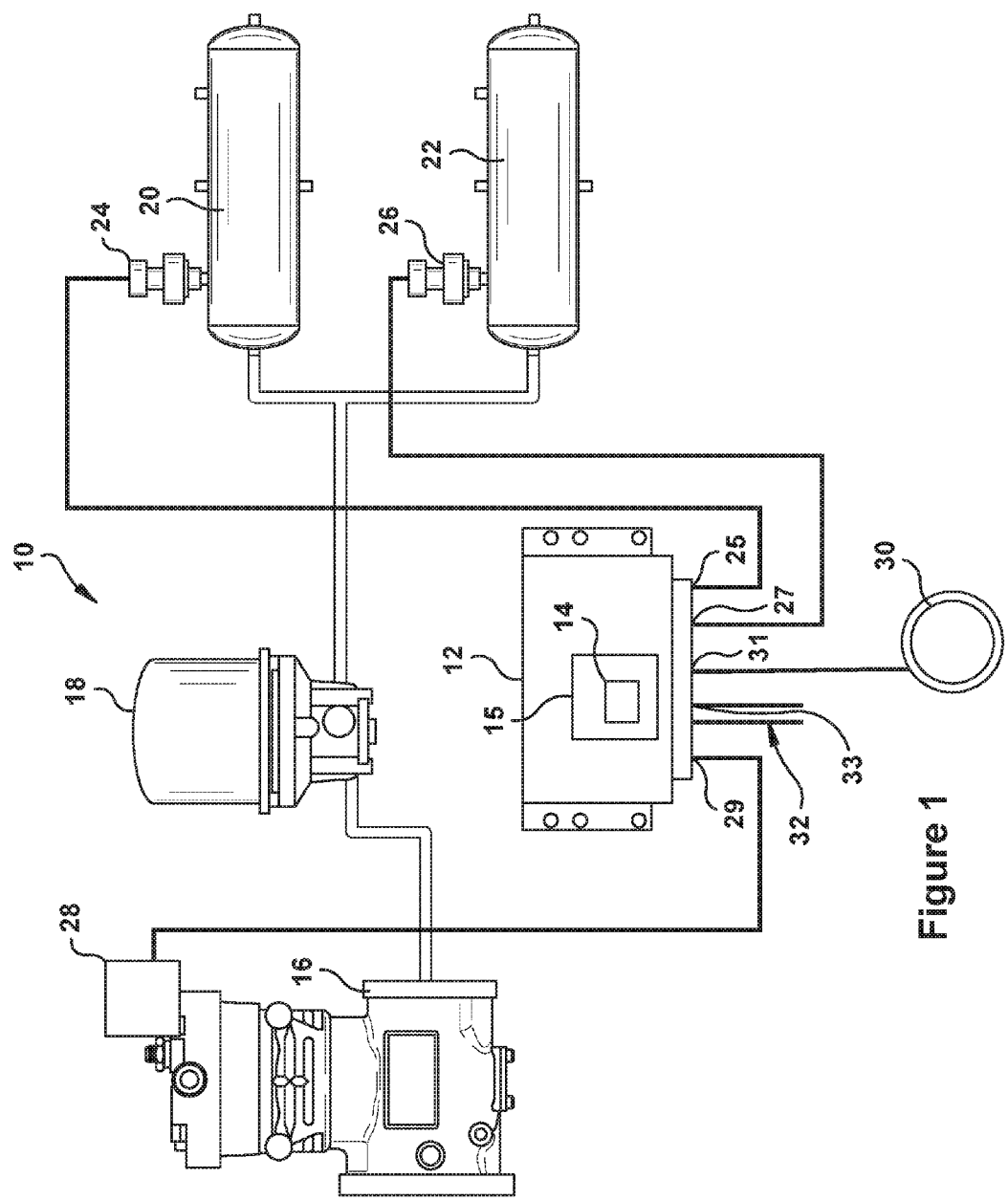
FIG. 1 illustrates an air charging system with an air monitoring controller, according to an example of this invention.

FIG. 1 illustrates a portion of an air charging system 10 on a vehicle that is equipped with an air brake system. The air charging system 10 includes a compressor 16 for compressing air. The compressor 16 is coupled to an engine (not shown). The compressor 16 will compress air when the engine is running and the compressor 16 is loaded. The compressor 16 provides compressed air according to a known compressor displacement, in other words, the compressed air delivery rate is known based on the engine speed. A governor 28 communicates with the compressor 16 and may be integral with the compressor 16 or located proximate to the compressor 16. If the governor 28 is an electropneumatic device, the governor 28 will set the compressor 16 in the loaded mode or the unloaded mode in response to an electrical signal. However, the governor 28 may be a mechanical device that responds to air pressure signals.

The air charging system 10 includes an air dryer 18. The air dryer 18 is coupled pneumatically to the compressor 16. The air dryer 18 receives the compressed air from the compressor 16 and removes oil, moisture and contaminants while drying the air.

The air charging system 10 includes a primary reservoir 20 and secondary reservoir 22. The reservoirs 20, 22 receive the clean dry air from the air dryer 18 and store the compressed air for usage by the air brake system or other air controlled components on the vehicle.

The air charging system 10 includes pressure sensors 24, 26. The pressure sensors 24, 26 transmit air pressure signals according to the pressure in the respective reservoirs 20, 22. The pressure sensors 24, 26 are shown coupled to the reservoirs 20, 22 but may be located elsewhere in the air charging system 10. FIG. 1 shows two pressure sensors 24, 26, however only one pressure sensor may be used. If one pressure sensor is used, then the preference is to monitor the primary tank 22 as it would fill after the secondary tank 20. In another example, a pressure sensor may be integrated into the controller 12 and system air pressure plumbed to the controller 12 from the primary tank 22.

The air charging system 10 may include an indicator 30. The indicator 30 receives a signal based on a determination that a problem may exist somewhere in the air system. The indicator 30 may be a lamp or a display in the dash of the vehicle to communicate the potential problem to the vehicle driver or a technician.

The air charging system 10 includes an air system monitoring controller 12. The pressure sensors 24, 26 are electrically coupled to the controller 12 at inputs 25, 27. The indicator 30 is electrically coupled to the controller 12 at output 31. In this example, the governor 28 is electrically connected to the controller 12 via output 29. The controller 12 includes a processing unit 15, control logic 14 and a timer. The processing unit 15 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The controller 12 may be a standalone controller or the control logic 14 may be integrated within a different controller that provides other functions to the vehicle, such as electronic air control or anti-lock braking.

The controller 12 may also communicate with a serial communications bus 32 on the vehicle via port 31. The controller 22 may communicate with other controllers on the vehicle via the serial communications bus 32 for receiving additional information about vehicle operating parameters, such as engine speed and brake actuation. The serial communications bus 32 may use a standardized bus format, such as SAE J1939. The status of the air system may also be transmitted by the controller 12 to other controllers over the serial communications bus 32.

A volume of air in the air system, as identified in this patent application, includes all of the pneumatic elements of the air charging system 10, plus air lines, fittings, air suspension bags, parking brake release chambers, and valves not shown in FIG. 1. The volume would not include the chambers and air lines filled during a service brake application.

The control logic 14 of the controller 12 is capable of determining a volume of the entire air system at an initial time, or first time, based on an air pressure signal from the pressure sensor 24, 26 and a vehicle factor, such as the engine speed, output air flow or the like. The control logic 14 is capable of determining the volume of the air system at a subsequent, or second, time based on the air pressure signal and the vehicle factor. The control logic 14 is capable of determining the difference between the volume at the first time and the volume at the second time. The control logic 14 can transmit an alert to the indicator 30 or to the serial communications bus 32 in response to a difference between the volume at the first time and volume at the second time. The control logic 14 may also change the operation of the compressor 16 based on the difference in the volume.

Therefore, a controller for monitoring an air system comprises an input for receiving at least one pressure signal indicative of air pressure in an air system and a processor having control logic. The control logic determines a volume of the air system at an initial time, or first time, based on the at least one air pressure signal and a vehicle factor; determines the volume of the air system at a subsequent, or second, time based on the at least one air pressure signal and the vehicle factor; determines the difference between the volume at the first time and the volume at the second time; and transmits an alert in response to a difference between the volume at the first time and volume at the second time. The control logic is also capable of changing the compressor operation in response to the alert.

Figure 2:
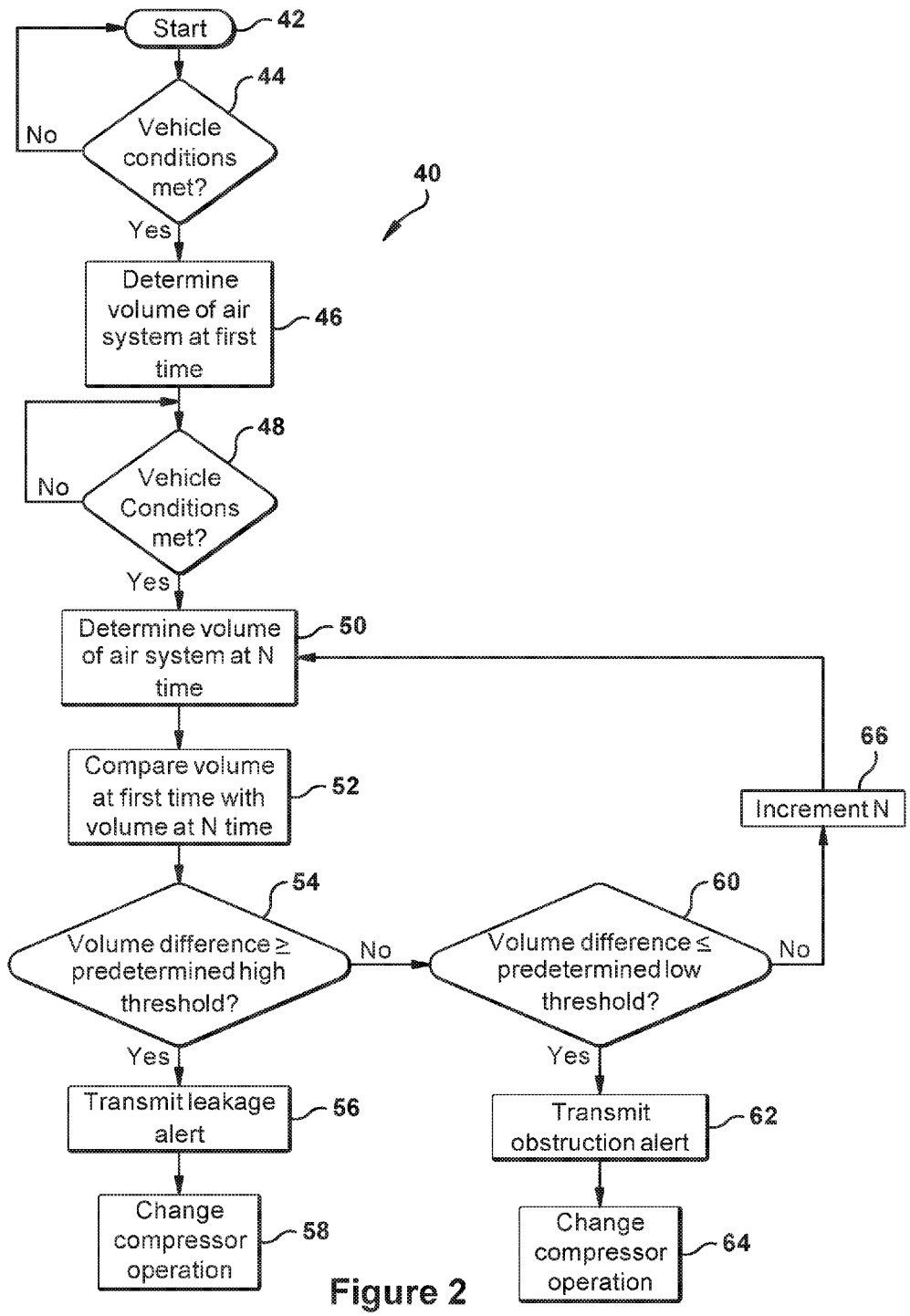
FIG. 2 illustrates a method of monitoring the air system according to an example of this invention.

FIG. 2 illustrates a method 40 of monitoring the air system, according to one example. The method 40 starts at step 42. The control logic 14 determines in step 44 whether certain vehicle conditions are met to determine the initial volume of the entire air system. One condition to be met includes the pressure as received from the pressure sensors 22, 24 being between about zero and atmospheric pressure. This initial pressure ensures that the calculation of volume will be the most accurate. The air monitoring system may calculate the volume of the system when the vehicle is first started at the beginning of the day or at another time when the air system is depleted, or nearly depleted. The time of this volume calculation will be at the first time. The pressure sensors 22, 24 are measuring the pressure in the reservoirs 26, 28 but may be located elsewhere in the air system. Another vehicle condition to be met is that there is no service brake actuation, whether by the driver or by an automated braking system on the vehicle. If all of the conditions are met, the method 40 proceeds to step 46. If any one of the conditions is not met, the method 40 returns to step 42.

In step 46, the control logic 14 of the controller 12 determines the volume of the entire air system. The controller 12 controls the governor 28 to set the compressor 16 in the loaded mode. The controller 12 receives pressure signals from the pressure sensors 22, 24. The control logic 14 begins the timer to count from the initial time the compressor 14 is set in the loaded mode until the time the pressure as received by the pressure sensors 22, 24 reaches a predetermined cut out pressure. In one example, the predetermined cut out pressure ranges from about 120 PSI (pounds per square inch) to about 130 PSI. The governor 28 will place the compressor 14 in the unloaded mode to discontinue delivery of compressed air once the cut out pressure is reached.

Once the time from the initial pressure to the cut out pressure is known by the control logic 14, the control logic 14 can then use a vehicle factor, such as a known compressor displacement or other vehicle factors received on the serial communications bus 32, to determine the total output of the compressor 16 over that known period of time. Other vehicle factors may include engine speed, compressor output map, tank back pressure and output air flow. The total output is then designated as the volume of the air system 10. For example, when the engine speed is 600 RPM, the compressor delivery rate according to the known compressor map is 0.12 cubic feet per second. If it takes 30 seconds to reach the cut out pressure at this delivery rate, the equation is: 0.12 CFS*30 sec=3.6 CF. 3.6 cubic feet is also 6221 cubic inches or 102 liters. If the engine speed varies during the measurement time, the time the engine is at any one speed is still known. The calculations for volume can be completed for each time at each engine speed and then summed or added together for a complete volume value. The method 40 then proceeds to step 48.

In step 48, the vehicle conditions are monitored again at a subsequent, or second, time. If the same vehicle conditions (namely, near zero air pressure and no brake usage) are met in step 48, the method proceeds to step 50. If the vehicle conditions are not met, the method remains at step 48.

In step 50, the volume of the entire air system is measured again at a subsequent, or second, time. The second time could be a predetermined time after the first time (e.g. five minutes), one or more power cycles after the first time or days later, as long as the vehicle conditions are met at that subsequent time. The air system volume at the second time is determined in the same manner as at the first time in step 46, using the vehicle factor and time to charge to the cut out pressure.

In step 52, the volume determined at the first time is compared to the volume determined at the second time. In step 54, the method 40 determines if the difference is greater than or equal to a predetermined high volume threshold. In one example, the predetermined high volume threshold is about 110% of the originally determined system volume. Having a greater volume determination at the second time generally means that there is a leak somewhere in the air system. If the difference is less than the predetermined high volume threshold, the method 40 proceeds to step 60. If the difference is greater than or equal to the predetermined high volume threshold, then the method 40 proceeds to step 56 and a leakage alert is transmitted. At that point, the controller 12 may activate the indicator 30 or transmit a message on serial communications bus 32 to inform other controllers that there is likely a leak in the air system.

In step 58, the controller 12 may change an operating parameter of the compressor 16 in response to a leakage alert. In one example, the controller 12 is connected to the electronic governor 28 for setting the cut in and cut out pressure. If a leakage error is detected, the control logic 14 can raise the value of the cut in pressure and the cut out pressure. The cut in pressure is the lowest pressure at which the compressor will return to the loaded mode to add compressed air to the system. In one example, the cut in pressure is about 100 PSI. If the cut in pressure is raised to 110 PSI and the cut out pressure is raised to 130 PSI for example, the pressure will be greater in the system and a leak would be less likely to affect the system operation until the time that the leak could be eliminated.

Alternatively, the control logic 14 can reduce the difference between the cut in and cut out pressure so that the compressor 16 cycles more often. For example, the cut in pressure could be set to 110 PSI and the cut out pressure set at 120 PSI. A compressor that cycles frequently during otherwise normal vehicle operation may be an indicator itself to the driver that there is a problem with the air system and that the controller 12 is trying to compensate for the potential air leak.

In step 60, the difference between the volume at the first time and the second time is compared to a predetermined low threshold. In one example, the predetermined low threshold is about 90% of the original system volume. If the value is less than or equal to the predetermined low threshold, the method 40 continues to step 62. An obstruction alert will be transmitted in step 62 because it is likely that an air line has become kinked or there is another similar problem downstream that is obstructing or preventing the air system from completing filling to the volume calculated in step 46. The operation of the compressor may be changed in step 64 to compensate for the calculation of a lower volume of air. To compensate for the detected obstruction and facilitate adherence to FMVSS 121 regulations, including a minimum cut in pressure of 100 PSI, the compressor operation can be changed in step 64. The cut in pressure may be raised from 110 PSI to 115 PSI to start the compressor at a higher pressure to provide a safer margin above the FMVSS 121 minimum required pressure. Also, the normal cut out pressure could be adjusted from 130 PSI to 125 PSI to increase the compressor duty cycle. This increased duty cycle keeps the compressor running more frequently, thereby more consistently building air and providing a safer margin above the minimum required pressure.

If the volume value is not greater than or equal to the predetermined low threshold, the method 40 will continue to step 66 to increment the time. The method 40 will then return to step 50 to determine another volume measurement at the new N time. The method 40 will run as long as the vehicle is powered.

Therefore, a method of monitoring an air system comprises determining a volume at an initial, or first, time based on the at least one air pressure signal and a vehicle factor; determining the volume at a subsequent, or second, time based on the at least one air pressure signal and the vehicle factor; determining the difference between the volume at the first time with the volume at the second time; and setting a leakage or obstruction alert in response to the difference being greater than a predetermined difference.

Figure 3:
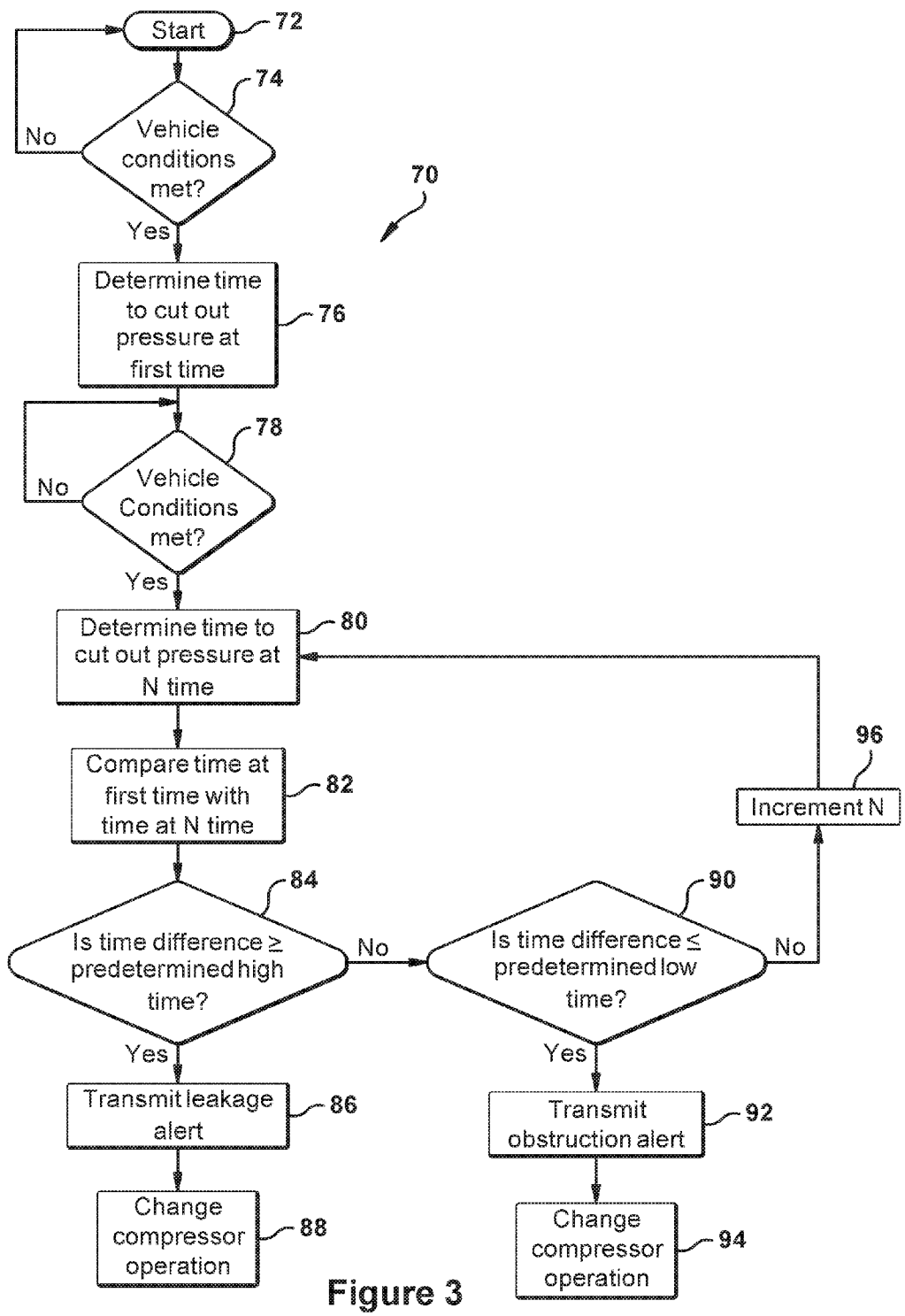
FIG. 3 illustrates a method of monitoring the air system according to another example of this invention.

FIG. 3 illustrates a method 70 of monitoring the air system, according to another example. The method 70 starts at step 72. The control logic 14 determines in step 74 whether certain vehicle conditions are met to determine the initial volume of the entire air system. One condition to be met includes the pressure as received from the pressure sensors 22, 24 being between about zero and atmospheric pressure. This initial pressure ensures that the calculation of volume will be the most accurate. The air monitoring system may calculate the volume of the system when the vehicle is first started at the beginning of the day or at another time when the air system is depleted, or nearly depleted. The time of this volume calculation will be at the first time. The pressure sensors 22, 24 are measuring the pressure in the reservoirs 26, 28 but may be located elsewhere in the air system. Another vehicle condition to be met is that the engine speed is running at a constant speed. In one example, the engine speed should be about 600 rpm. Another vehicle condition to be met is that there is no service brake actuation, whether by the driver or by an automated braking system on the vehicle. If all of the conditions are met, the method 70 proceeds to step 76. If any one of the conditions is not met, the method 70 returns to step 72.

In step 76, the controller 12 controls the governor 28 to set the compressor 16 in the loaded mode. The controller 12 receives pressure signals from the pressure sensors 22, 24. The control logic 14 begins the timer to count from the time the compressor 14 is set in the loaded mode until the time the pressure as received by the pressure sensors 22, 24 reaches a predetermined cut out pressure. In one example, the predetermined cut out pressure ranges from about 120 PSI to about 130 PSI. The governor 28 will place the compressor 14 in the unloaded mode to discontinue delivery of compressed air once the cut out pressure is reached. Once the time from the initial pressure to the cut out pressure is known by the control logic 14, the method 70 proceeds to step 78.

In step 78, the vehicle conditions are monitored again at a subsequent, or second, time. If the same vehicle conditions (namely, near zero air pressure and no brake usage) are met in step 78, the method proceeds to step 80. If the vehicle conditions are not met, the method remains at step 78.

In step 80, the time to reach the cut out pressure is measured again at a subsequent, or second, time. The second time could be a predetermined time after the first time (e.g. five minutes), one or more power cycles after the first time or days later, as long as the vehicle conditions are met at that subsequent time.

In step 82, the time to reach the cut out pressure at the first time is compared to the time to reach the cut out pressure at the second time. In step 84, the control logic 14 determines if the difference is greater than or equal to a predetermined high time. In one example, the predetermined high time is about 125% of the time at the first time. Having a greater time at the second time generally means that there is a leak somewhere in the air system. If the difference is less than the predetermined high time, the method 70 proceeds to step 90. If the difference is greater than or equal to the predetermined high time, the method 70 would proceed to step 86 and a leakage alert would be transmitted.

In step 88, the controller 12 may change an operating parameter of the compressor 16 in response to a leakage alert. In one example, the controller 12 is connected to the electronic governor 28 for setting the cut in and cut out pressure. If a leakage error is detected, the control logic 14 can raise the value of the cut in and cut out pressure. Therefore, the pressure will be greater in the system and a leak would be less likely to affect the system operation until the leak is eliminated. Additionally, the higher pressure setting for the cut in pressure will ensure that the air system does not drop below the FMVSS 121 requirement of minimum system pressure of 100 PSI.

Alternatively, the control logic 14 can reduce the difference between the cut in and cut out pressure so that the compressor 16 cycles more often. A compressor that cycles frequently during otherwise normal vehicle operation may be an indicator itself to the driver that there is a problem with the air system and that the controller 12 is trying to compensate for the potential air leak.

In step 90, the difference between the time to reach the cut out pressure at the first time and the time to reach the cut out pressure at the second time is compared to a predetermined low time. In one example, the predetermined low time is about 75% of the original time. If the difference is less than or equal to the predetermined low time, the method 70 continues to step 92. An obstruction alert will be transmitted in step 92. The operation of the compressor may be changed in step 94 to compensate for the determination of the lower air volume. To compensate for the detected obstruction and facilitate adherence to FMVSS 121 regulations, including a minimum cut in pressure of 100 PSI, the compressor operation can be changed in step 94. The cut in pressure may be adjusted from 110 PSI to 115 PSI to start the compressor at a higher pressure to provide a safer margin above the minimum required pressure. Also, the normal cut out pressure could be adjusted from 130 PSI to 125 PSI to increase the compressor duty cycle. This increase duty cycle keeps the compressor running more frequently, thereby more consistently building air and providing a safer margin above the minimum required pressure. The increased duty cycle may be an indicator itself to the driver that there is a problem with the air system.

If the time is not greater than the predetermined low time, the method 70 will continue to step 96 to increment the time. The method 70 will then return to step 80 to determine another time to reach the cut out pressure at the new N time. The method 70 will run as long as the vehicle is powered.

Therefore, a method of monitoring an air system comprises determining a time to reach a cut out pressure at an initial, or first, time based on the at least one air pressure signal; determining a time to reach the cut out pressure at a subsequent, or second, time based on the at least one air pressure signal; determining the difference between the time at the first time with the time at the second time; and setting a leakage or obstruction alert in response to the difference being greater than a predetermined difference.

Figure 4:
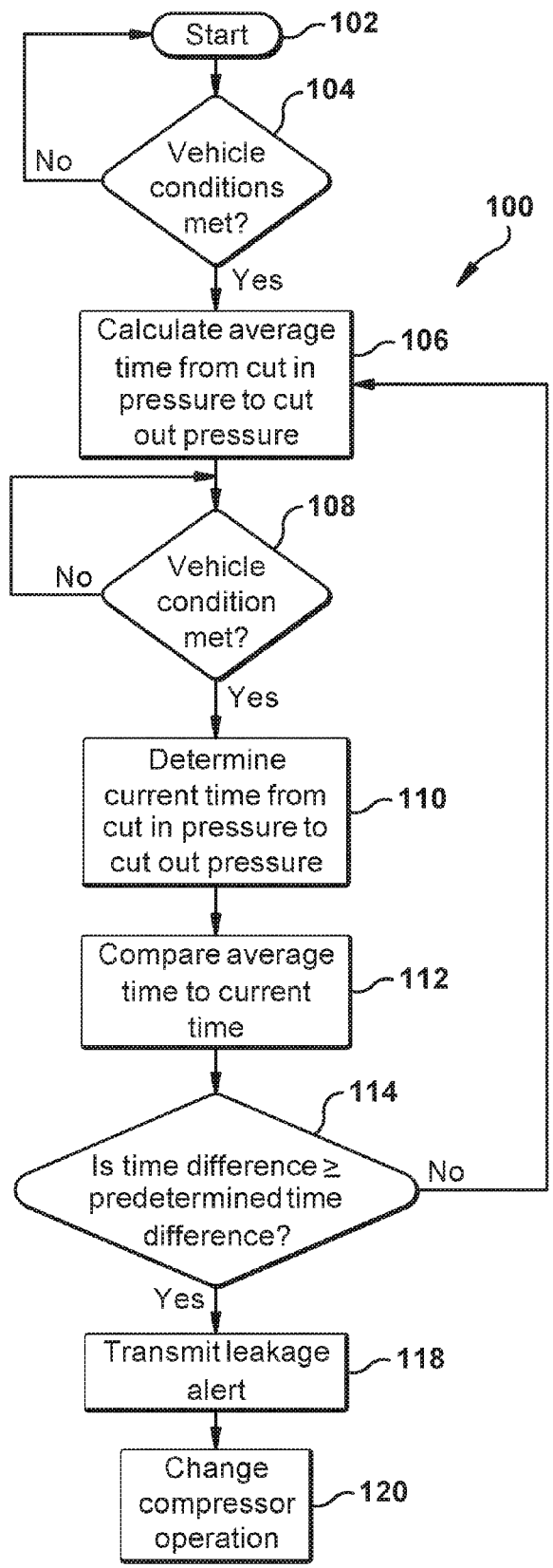
FIG. 4 illustrates a method of monitoring the air system according to another example of this invention.

FIG. 4 illustrates another method 100 of monitoring an air system. In step 102, the method 100 begins. In step 104, the vehicle conditions are checked to determine if the vehicle conditions are met. For method 100, the vehicle conditions include a pressure at the cut in pressure, constant engine speed and no service brake actuation. If the vehicle conditions are met, the method 100 proceeds to step 106. If the vehicle conditions are not met, the method 100 returns to step 102.

In step 106, the time to build air pressure from a cut in pressure to a cut out pressure is measured. An average time is calculated using several different measurements over time.

In step 108, the determination is made again of whether the vehicle conditions are met (namely, pressure at the cut in pressure, constant engine speed and no brake usage). If the vehicle conditions are met, the method 100 proceeds to step 110. If the vehicle conditions are not met, the method 100 remains at step 108.

In step 110, a current time from the cut in pressure to the cut out pressure is measured. In step 112, the current time is compared to the average time as determined in step 106. If the difference between the current time and the average time is greater than or equal to a predetermined difference in step 114, a leakage alert is transmitted in step 118. In one example, the predetermined difference is about 25%. In step 120, the operation of the compressor may be changed in response to the leakage alert. To compensate for the detected leakage and facilitate adherence to FMVSS 121 regulations, the operation would change so that the normal cut in pressure would be adjusted from 110 PSI to 115 PSI to start the compressor at a higher pressure to provide a safer margin above the minimum required pressure. Also, the normal cut out pressure could be adjusted from 130 PSI to 125 PSI to increase the compressor duty cycle. This increased duty cycle keeps the compressor running thereby more consistently building air and providing a larger margin above the minimum required pressure. The increased compressor duty cycle in itself may be an indicator to the driver that there is a problem with the air system.

If the difference in step 114 is not greater than or equal to the predetermined difference, then the method 100 returns to step 106, where the time from step 110 is included in the average from step 106. The method 100 continues as long as the vehicle is powered.

The air system monitoring methods 40, 70 and 100 provide means to determine the air system volume and track the time to build air pressure in the system over time so that abnormalities can be detected and indicated to the driver and any failure effects can be mitigated. Timely prognostics allow for less expensive maintenance and improved air system integrity. Warnings and change in compressor operation preemptively prevent vehicles from violating FMVSS requirements and avoid costly vehicle breakdowns while the vehicle is in service.

Therefore, a method of monitoring an air system comprises determining a time to reach a cut out pressure from a cut in pressure based on the at least one air pressure signal, constant engine speed and no brake applications. The method determines a time to reach the cut out pressure at a subsequent, or second, time based on the at least one air pressure signal; determines the difference between the time at the first time with the time at the second time; sets a leakage or obstruction alert in response to the difference being greater than a predetermined difference and changes the compressor operation.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A controller for monitoring an air system in a vehicle comprising:
   an input for receiving at least one pressure signal indicative of an air pressure value in an air system;
   an output for transmitting an alert to a vehicle operator; and
   a processor, the processor comprising control logic for determining an instant cut out time indicative of the time for the air pressure value to reach a cut out pressure value from a cut in pressure value;

determining a difference between the instant cut out time to an average cut out time; and transmitting a leakage alert at the output in response to the instant cut out time being greater than or equal to a predetermined difference from the average cut out time.

2. The controller as in claim 1, wherein the predetermined difference is about 25%.

3. The controller as in claim 1, wherein the average cut out time is calculated from a plurality of cut out times determined over a period of time.

4. The controller as in claim 1, wherein the input further receives a signal indicative of a brake usage, wherein determining the instant cut out time occurs when the signal indicates no brake usage.

5. The controller as in claim 1, wherein the control logic further transmits a signal at the output to change the cut in pressure value.

6. The controller as in claim 5, wherein the cut in pressure value is increased.

7. The controller as in claim 5, wherein the control logic further transmits a signal at the output to change the cut out pressure value.

8. The controller as in claim 7, wherein the cut out pressure is decreased.

9. A method for monitoring an air system in a vehicle comprising:

receiving at least one pressure signal indicative of an air pressure value in an air system;

determining an instant cut out time indicative of the time for the air pressure value to reach a cut out pressure value from a cut in pressure value;

determining a difference between the instant cut out time to an average cut out time; and transmitting a leakage alert in response to the instant cut out time being greater than or equal to a predetermined difference from the average cut out time.

10. The method as in claim 9, wherein the predetermined difference is about 25%.

11. The method as in claim 9, further comprising calculating the average cut out time from a plurality of cut out times measured over a predetermined period of time.

12. The method as in claim 9, further comprising determining the instant cut out time occurs when no brake usage is occurring.

13. The method as in claim 9, further comprising transmitting a signal to change the cut in pressure value.

14. The method as in claim 13, wherein the cut in pressure value is increased.

15. The method as in claim 9, further comprising transmitting a signal to change the cut out pressure value.

16. The method as in claim 15, wherein the cut out pressure is decreased.

\* \* \* \* \*